United States Patent
Santhanam et al.

(10) Patent No.: US 10,244,457 B1
(45) Date of Patent: Mar. 26, 2019

(54) SERVICE SEARCH USING GEOFENCE CONFIGURATIONS

(71) Applicant: QUALCOMM Incorporated, San Diego, CA (US)

(72) Inventors: Arvind Santhanam, San Diego, CA (US); Srinivasan Balasubramanian, San Diego, CA (US); Reza Shahidi, San Diego, CA (US); Neha Goel, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/698,169

(22) Filed: Sep. 7, 2017

(51) Int. Cl.
| | |
|---|---|
| *H04W 24/00* | (2009.01) |
| *H04W 36/32* | (2009.01) |
| *H04W 4/021* | (2018.01) |
| *H04M 1/725* | (2006.01) |
| *H04W 8/00* | (2009.01) |
| *H04W 8/30* | (2009.01) |

(52) U.S. Cl.
CPC ....... *H04W 36/32* (2013.01); *H04M 1/72572* (2013.01); *H04W 4/022* (2013.01); *H04W 8/005* (2013.01); *H04W 8/30* (2013.01)

(58) Field of Classification Search
CPC . H04W 64/00; H04W 64/003; H04W 64/006; H04W 4/02; H04W 4/021; H04W 48/16; H04W 48/18; H04W 48/20; H04W 88/06
USPC ................... 455/456.1, 456.6, 434
See application file for complete search history.

(56) References Cited

U.S. PATENT DOCUMENTS

| | | | |
|---|---|---|---|
| 2010/0069088 A1* | 3/2010 | Fischer ................. | H04W 60/04 455/456.1 |
| 2011/0207491 A1 | 8/2011 | Swaminathan | |
| 2012/0302241 A1* | 11/2012 | Klingenbrunn ....... | H04W 48/16 455/436 |
| 2013/0109377 A1* | 5/2013 | Al-Khudairi ......... | H04W 48/16 455/432.1 |
| 2015/0004966 A1* | 1/2015 | Ayleni .............. | H04W 36/0005 455/433 |
| 2015/0341846 A1* | 11/2015 | Shi ........................ | H04W 48/16 455/434 |

(Continued)

FOREIGN PATENT DOCUMENTS

WO   WO-2015154789 A1   10/2015

*Primary Examiner* — Temica M Beamer
(74) *Attorney, Agent, or Firm* — Arent Fox, LLP

(57) ABSTRACT

The present aspects relate to out-of-service searches in a wireless communication system. Specifically, the present aspects provide that while in an out-of-service state corresponding to a radio resource disconnection, a user equipment (UE) may determine that a first time duration following entry into the out-of-service state has elapsed. The UE may further obtain a geofence identifier representing a shape forming a geographic region including one or more boundaries based on determining that the first time duration has elapsed. The UE may further identify at least one location identifier based at least on the geofence identifier and determine at least one radio access technology (RAT) and one or more associated frequency bands based on the at least one location identifier. The UE may further search on the at least one RAT and one or more associated frequency bands for at least one network entity within the geographic region.

27 Claims, 11 Drawing Sheets

(56) References Cited

U.S. PATENT DOCUMENTS

| | | |
|---|---|---|
| 2015/0351013 A1 | 12/2015 | Zhang et al. |
| 2016/0150450 A1 | 5/2016 | Balasubramanian et al. |
| 2016/0219556 A1 | 7/2016 | Kim et al. |
| 2018/0167800 A1* | 6/2018 | Nair ..................... H04W 8/005 |

* cited by examiner

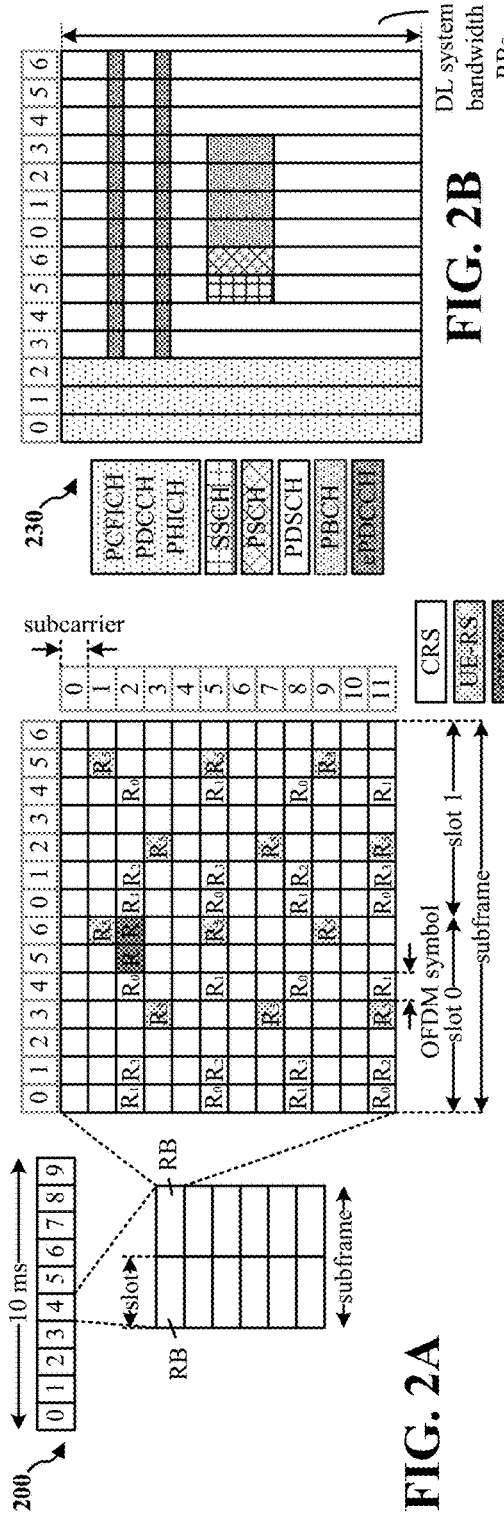
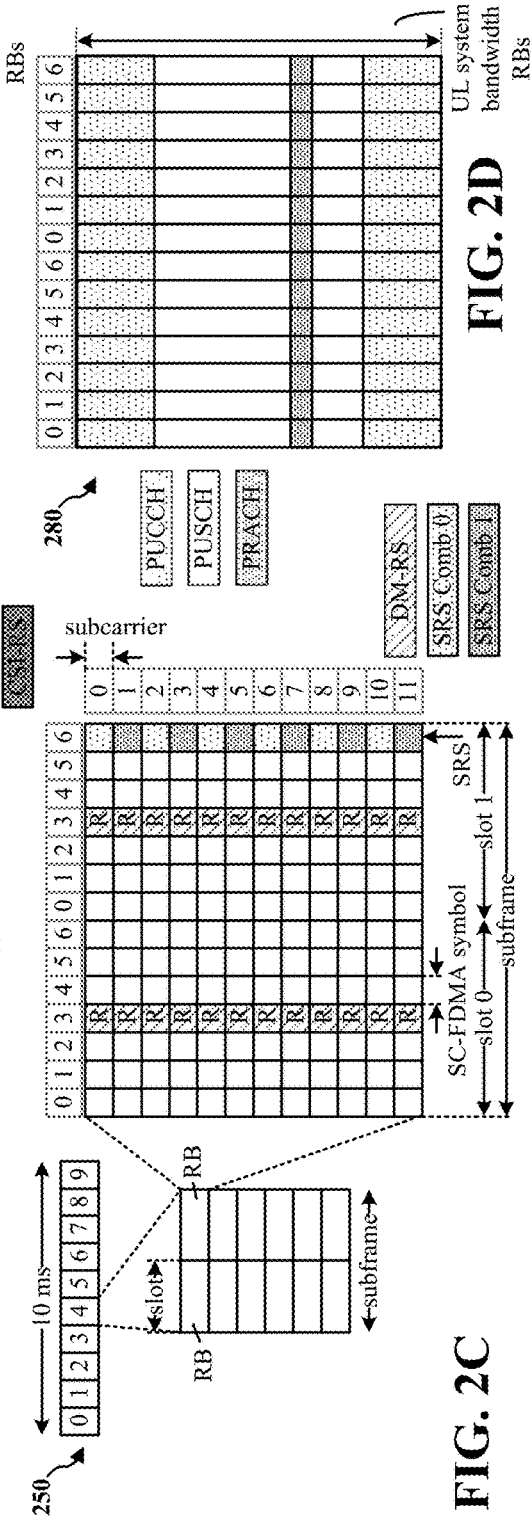
FIG. 2A  FIG. 2B  FIG. 2C  FIG. 2D

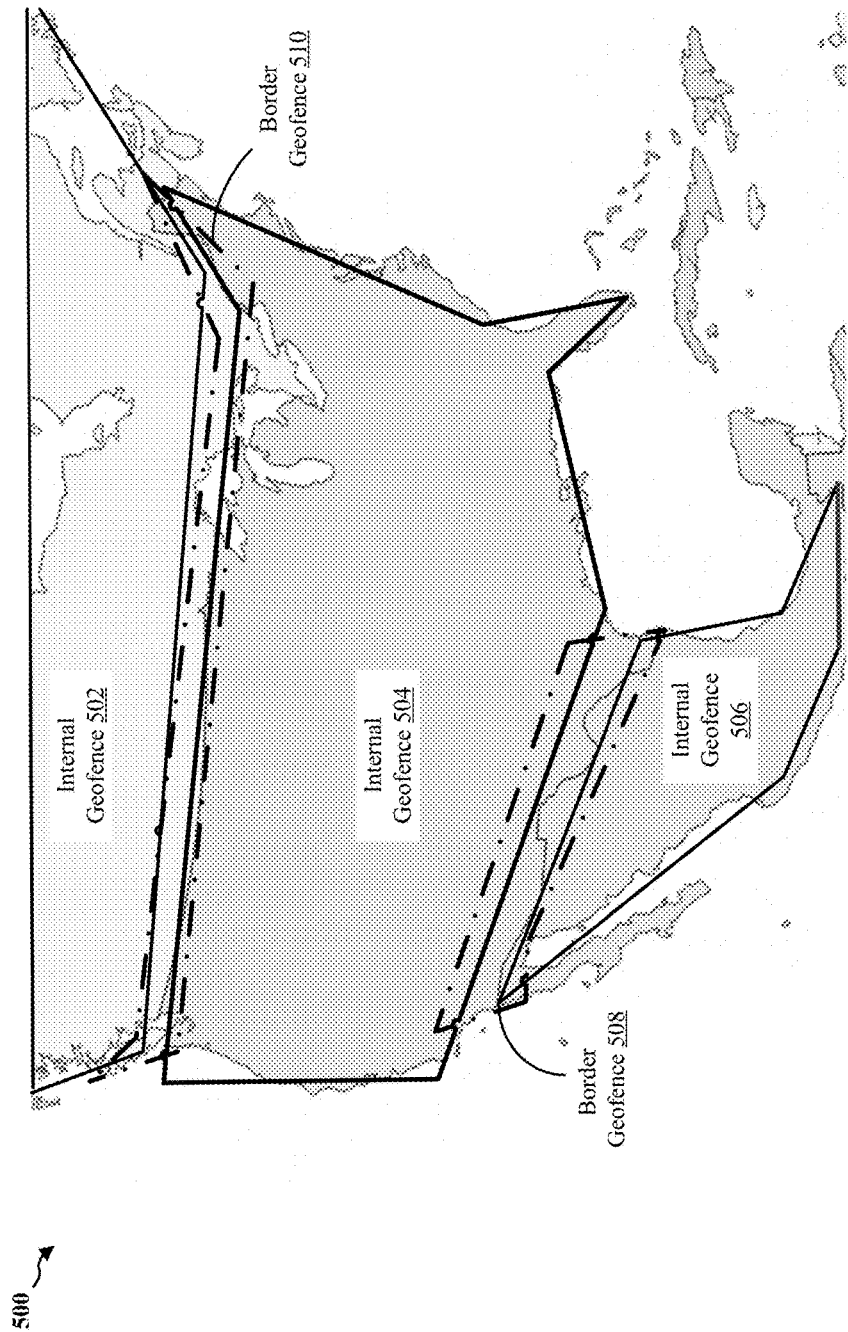

SERVICE SEARCH USING GEOFENCE CONFIGURATIONS

BACKGROUND

The present disclosure relates generally to communication systems, and more particularly, to service search using geofence configurations in a wireless communications system.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and MIMO antenna technology. However, as the demand for mobile broadband access continues to increase, there exists a need for further improvements in LTE technology. These improvements may also be applicable to other multi-access technologies and the telecommunication standards that employ these technologies.

In some wireless communication systems, one or more user equipments (UEs) may lose network service during various scenarios. In such out-of-service scenarios, the UE may be unaware of its precise location. As such, in order to reestablish service in a location where the UE may not have network information relating to supported radio access technologies and/or frequencies, the UE may perform a broad network search that consumes high amounts of battery power. Thus, it may be desirable to perform a targeted service search during an out-of-service scenario.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method of communication at a user equipment (UE) is provided. The method may be performed while in an out-of-service state corresponding to a radio resource disconnection. The method may include determining that a first time duration following entry into the out-of-service state has elapsed. The method may further include obtaining a geofence identifier representing a shape forming a geographic region including one or more boundaries based on determining that the first time duration has elapsed. The method may further include identifying at least one location identifier based at least on the geofence identifier. The method may further include determining at least one radio access technology (RAT) and one or more associated frequency bands based on the at least one location identifier. The method may further include searching on the at least one RAT and one or more associated frequency bands for at least one network entity within the geographic region.

In accordance with an aspect, an apparatus for communication may include a memory and at least one processor coupled to the memory. While in an out-of-service state corresponding to a radio resource disconnection, the at least one processor may be configured to determine that a first time duration following entry into the out-of-service state has elapsed. The at least one processor may further be configured to obtain a geofence identifier representing a shape forming a geographic region including one or more boundaries based on determining that the first time duration has elapsed. The at least one processor may further be configured to identify at least one location identifier based at least on the geofence identifier. The at least one processor may further be configured to determine at least one RAT and one or more associated frequency bands based on the at least one location identifier. The at least one processor may further be configured to search on the at least one RAT and one or more associated frequency bands for at least one network entity within the geographic region.

In accordance with an aspect, an apparatus for communication may, while in an out-of-service state corresponding to a radio resource disconnection, include means for determining that a first time duration following entry into the out-of-service state has elapsed. The apparatus may include means for obtaining a geofence identifier representing a shape forming a geographic region including one or more boundaries based on determining that the first time duration has elapsed. The apparatus may further include means for identifying at least one location identifier based at least on the geofence identifier. The apparatus may further include means for determining at least one RAT and one or more associated frequency bands based on the at least one location identifier. The apparatus may further include means for searching on the at least one RAT and one or more associated frequency bands for at least one network entity within the geographic region.

In accordance with an aspect, a computer-readable medium storing computer executable code may, while in an out-of-service state corresponding to a radio resource disconnection, include code for determining that a first time duration following entry into the out-of-service state has elapsed. The computer-readable medium may further include code for obtaining a geofence identifier representing a shape forming a geographic region including one or more boundaries based on determining that the first time duration has elapsed. The computer-readable medium may further include code for identifying at least one location identifier based at least on the geofence identifier. The computer-readable medium may further include code for determining at least one RAT and one or more associated frequency bands based on the at least one location identifier. The computer-readable medium may further include code for searching on the at least one RAT and one or more associated frequency bands for at least one network entity within the geographic region.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings are presented to aid in the description of various aspects of the disclosure and are provided solely for illustration of the aspects and not limitation thereof. The drawings include like reference numbers for like elements, and may represent optional components or actions using dashed lines.

FIGS. 2A, 2B, 2C, and 2D are diagrams illustrating LTE examples of a DL frame structure, DL channels within the DL frame structure, an UL frame structure, and UL channels within the UL frame structure, respectively.

FIG. 5 is a diagram illustrating an aspect of various geofences in accordance with various aspects of the present disclosure.

DETAILED DESCRIPTION

Figure 1:
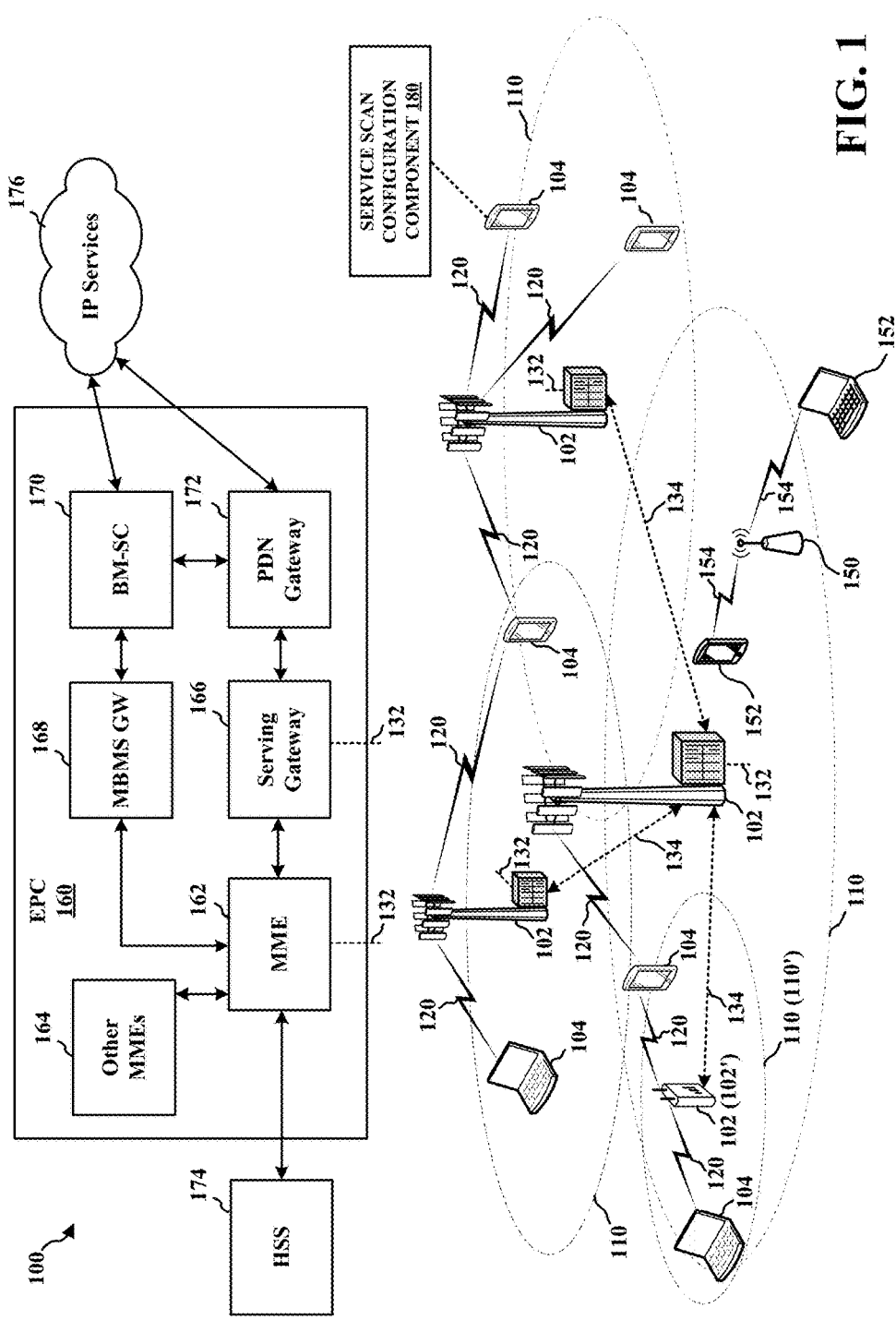
FIG. 1 is a diagram illustrating an example of a wireless communications system and an access network including a user equipment (UE) having an aspect of a service scan configuration component at the UE as described herein and in accordance with various aspects of the present disclosure.

The present aspects generally relate to efficient service acquisition. During some mobility scenarios, a user equipment (UE) may exit or transition out of a service area resulting in an out-of-service (OOS) state. That is, mobile service may be provided by an operator or service entity within a defined geographic area. When a UE exits the defined geographic area into a different geographic area, service may be lost resulting in an OOS state. During the OOS state, or more specifically, a radio link failure (RLF) state, the UE may attempt to reestablish a connection (e.g., radio resource control (RRC) connection) with a network. In some wireless communication systems, a UE may engage in at least one full radio access technology (RAT) band scan during the OOS state. For instance, after a certain period of time in the OOS state, full RAT scans of all or nearly all frequency bands and RATs may be performed following scans of the frequency bands and/or RATs in a database (e.g., acquisition database) of known or previously camped frequency bands/RATs.

However, engaging in such procedures may result in high power consumption of a limited power supply/source of the UE due to repeated full power scans on frequency bands/RATs that are not even deployed in the different geographic area. Additionally, there may be a delay between deactivation and activation of radio resources (e.g., during power up or deactivating airplane mode). Acquisition may also be delayed if the UE scans bands that are not deployed in that area. In such a scenario, the UE may scan the acquisition database and/or frequency bands used for a home mobile country code (MCC) in a roaming MCC. In some aspects, an MCC may be a unique identifier that identifies a geographic region. Further, frequency bands in one geographic region may not be used or deployed in another geographic region, resulting in longer delay times in determining the MCC. As such, it may be desirable to optimize OOS scans/searches.

Accordingly, the present aspects provide an OOS search procedure for a UE that accounts for at least global positioning system (GPS) data to reduce power consumption by obviating a number of full RAT scans/searches, as well as expedite establishment/reestablishment of a connection with a network (e.g., in the same or different geographic area). Specifically, upon reaching or satisfying a first time duration during an OOS state, the UE may obtain GPS data. The UE may then determine, based on the GPS data, that the UE has entered a different geographic region compared to one associated with a previous MCC. In some aspects, the UE may store geographic data associated with various MCCs such as, but not limited to, one or more geofences that define a particular geographic area. As such, upon determining that the UE has entered a different geographic region, at least one MCC associated with the different geographic region may be identified. Subsequently, the UE may halt a full RAT scan/search and initiate an MCC-based band scan/search corresponding to the at least one MCC of the different geographic region. The MCC-based band scan/search may be conducted for a second time duration before resuming the full RAT scan/search, thereby potentially saving power supply and expediting network connection.

The detailed description set forth herein in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. Additionally, the term "component" as used herein may be one of the parts that make up a system, may be hardware, firmware, and/or software stored on a computer-readable medium, and may be divided into other components By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 including at least one UE 104 configured to include the service scan configuration component 180, which may be configured to scan one or more RATs and/or associated frequency bands during an out-of-service state based on an MCC identified using an geofence identifier representing a polygon and/or shape forming a geographic region including one or more boundaries, and in accordance with various aspects of the present disclosure. The wireless communications system 100 (also referred to as a wireless wide area network (WWAN)) includes base stations 102, UEs 104, and an Evolved Packet Core (EPC) 160. Further, the base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system 100 may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, an access point, a base transceiver station, a radio base station, a radio transceiver, a transceiver function, a basic service set (BSS), an extended service set (ESS), or some other suitable terminology. The eNB 102 provides an access point to the EPC 110 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a DL frame structure in LTE, which may be an example of a frame structure that may be received by at least one UE 104 including service scan configuration component 180 in accordance with various aspects of the present disclosure. FIG. 2B is a diagram 230 illustrating an example of channels within the DL frame structure in LTE that may be used by UE 104 as described herein. FIG. 2C is a diagram 250 illustrating an example of an UL frame structure in LTE that may be used by UE 104. FIG. 2D is a diagram 280 illustrating an example of channels within the UL frame structure in LTE that may be used by UE 104 including communication configuration component 420 to transmit data to base station 102 including device configuration component 440 in accordance with various aspects of the present disclosure. Other wireless communication technologies may have a different frame structure and/or different channels. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS for channel estimation at the eNB, the transmission of which may be configured at or by base station 102 including resource allocation component 440 and UE 104 including reference signal configuration component 420. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
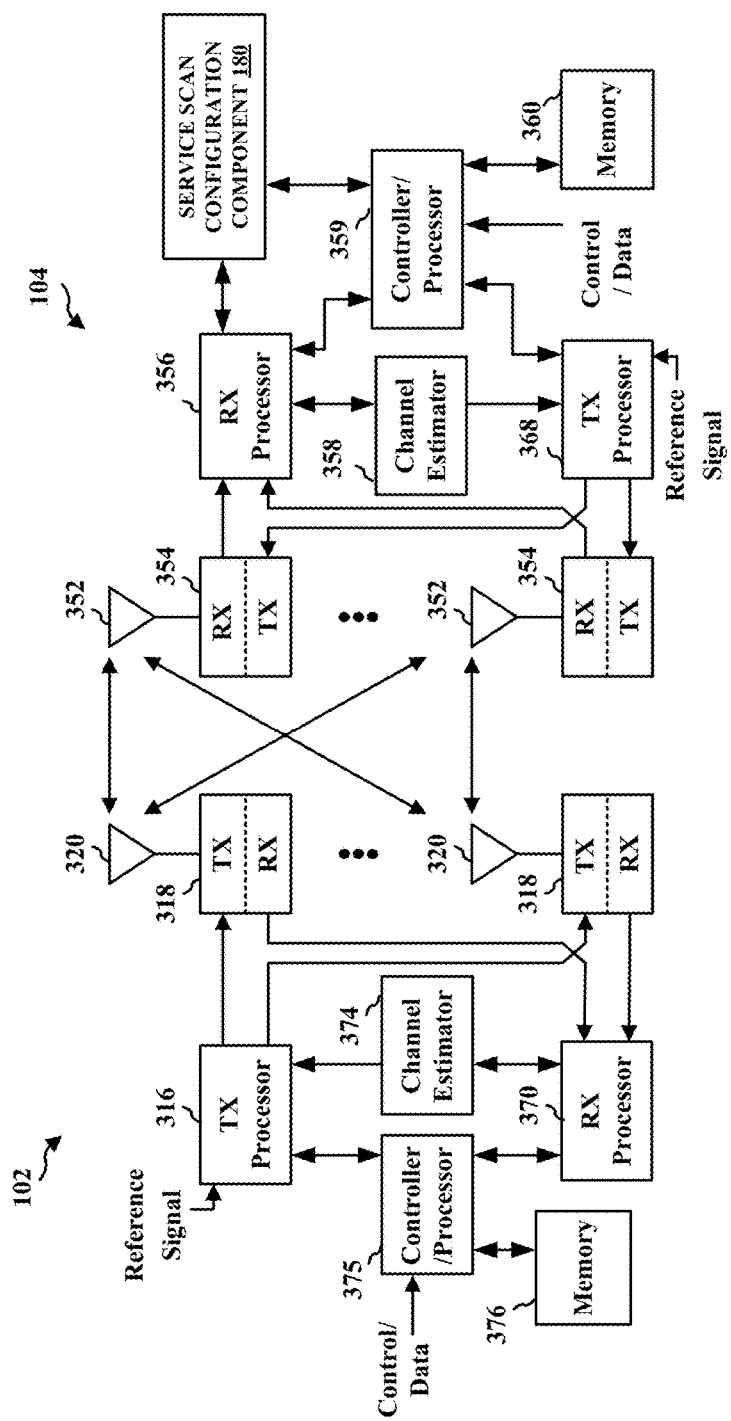
FIG. 3 is a diagram illustrating an example of an eNodeB and UE in an access network, where the UE includes an aspect of a service scan configuration component as described herein and in accordance with various aspects of the present disclosure.

FIG. 3 is a block diagram of a base station 102 (e.g., eNB) in communication with UE 104 in an access network. In an aspect, UE 104 may be configured to include service scan configuration component 180. In an aspect, service scan configuration component 180 may be configured to scan one or more RATs and/or associated frequency bands during an out-of-service state based on an MCC identified using an geofence identifier corresponding to a polygon and/or shape forming a geographic region including one or more boundaries. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

Figure 4A:
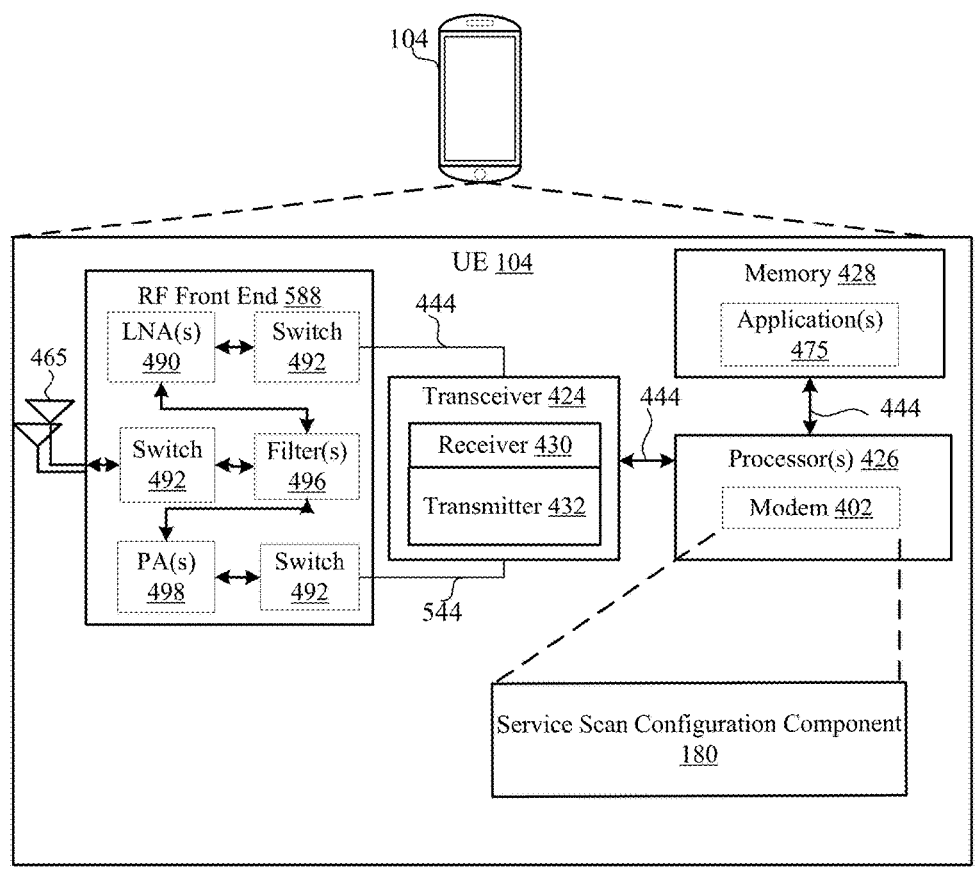
FIGS. 4A and 4B are schematic diagrams of example components of the UE including the service scan configuration component in accordance with various aspects of the present disclosure.
Figure 4B:
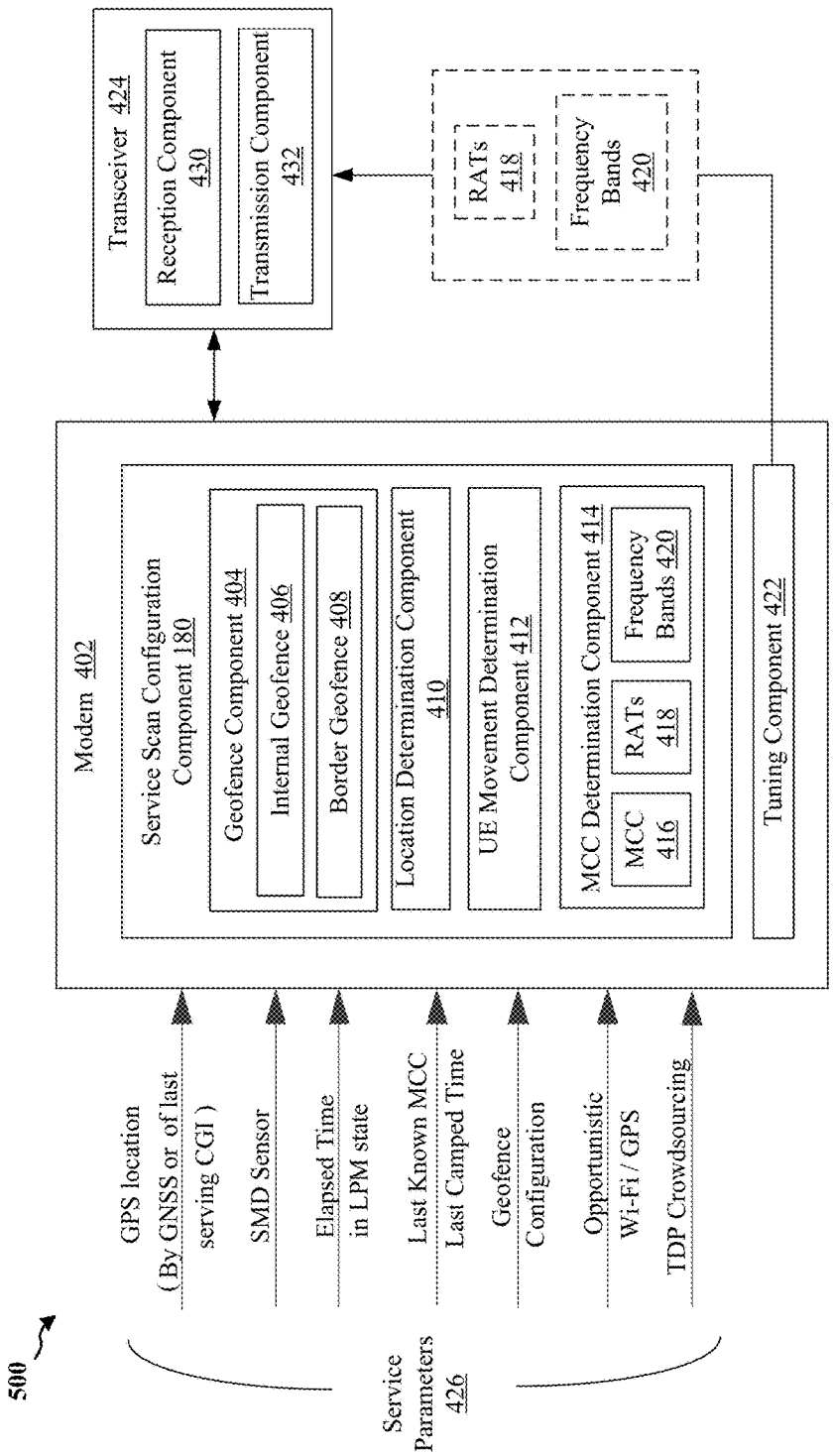

Referring to FIGS. 4A and 4B, one example of an implementation of UE 110 may include a variety of components, some of which have already been described above, but including components such as one or more processors 426 and memory 428 and transceiver 424 in communication via one or more buses 444, which may operate in conjunction with modem 402 and service scan configuration component 180 as described herein. Further, the one or more processors 426, modem 402, memory 428, transceiver 424, radio frequency (RF) front end 488 and one or more antennas 465, may be configured to support voice and/or data calls (simultaneously or non-simultaneously) in one or more radio access technologies.

In an aspect, a modem 402 of a UE such as UE 104 may include a variety of components such as the service scan configuration component 180, a tuning component 422, at least one processor 426, and/or a memory 428. The various functions related to the service scan configuration component 180 may be included in modem 4002 and/or the at least one processor 426 and, in an aspect, can be executed by a single processor, while in other aspects, different ones of the functions may be executed by a combination of two or more different processors. For example, in an aspect, the at least one processor 426 may include any one or any combination of a modem processor, or a baseband processor, or a digital signal processor, or a transmit processor, or a receiver processor, or a transceiver processor associated with transceiver 424. In other aspects, some of the features of the at least one processor 426 and/or modem 402 associated with service scan configuration component 180 may be performed by transceiver 424.

Also, a memory 428 may be configured to store data used herein and/or local versions of or related to service scan configuration component 180 and/or one or more of its subcomponents being executed by at least one processor 426. The memory 428 can include any type of computer-readable medium usable by a computer or at least one processor 426, such as random access memory (RAM), read only memory (ROM), tapes, magnetic discs, optical discs, volatile memory, non-volatile memory, and any combination thereof. In an aspect, for example, the memory 428 may be a non-transitory computer-readable storage medium that stores one or more computer-executable codes defining service scan configuration component 180 and/or one or more of its subcomponents, and/or data associated therewith, when UE 104 is operating at least one processor 426 to execute service scan configuration component 180 and/or one or more of its subcomponents.

The transceiver 424 may include at least one reception component 430 and at least one transmission component 432. The reception component 430 may include hardware, firmware, and/or software code executable by a processor for receiving data, the code comprising instructions and being stored in a memory (e.g., computer-readable medium). The reception component 430 may be, for example, a RF receiver. In an aspect, the reception component 430 may receive signals transmitted by at least one base station 102. Additionally, the reception component 430 may process such received signals, and also may obtain measurements of the signals. The transmission component 432 may include hardware, firmware, and/or software code executable by a processor for transmitting data, the code comprising instructions and being stored in a memory (e.g., computer-readable medium). An example of the transmission component 432 may include, but is not limited to, an RF transmitter.

Moreover, in an aspect, UE 104 may include RF front end 488, which may operate in communication with one or more antennas 465 and transceiver 424 for receiving and transmitting radio transmissions, for example, wireless communications transmitted by at least one base station 102 or wireless transmissions transmitted by UE 104. RF front end 488 may be connected to one or more antennas 465 and can include one or more low-noise amplifiers (LNAs) 490, one or more switches 492, one or more power amplifiers (PAs) 498, and one or more filters 496 for transmitting and receiving RF signals.

In an aspect, LNA 490 can amplify a received signal at a desired output level. In an aspect, each LNA 490 may have a specified minimum and maximum gain values. In an aspect, RF front end 588 may use one or more switches 492 to select a particular LNA 490 and its specified gain value based on a desired gain value for a particular application.

Further, for example, one or more PA(s) 498 may be used by RF front end 488 to amplify a signal for an RF output at a desired output power level. In an aspect, each PA 498 may have specified minimum and maximum gain values. In an aspect, RF front end 588 may use one or more switches 492 to select a particular PA 498 and a corresponding specified gain value based on a desired gain value for a particular application.

Also, for example, one or more filters 496 can be used by RF front end 488 to filter a received signal to obtain an input RF signal. Similarly, in an aspect, for example, a respective filter 496 can be used to filter an output from a respective PA 498 to produce an output signal for transmission. In an aspect, each filter 496 can be connected to a specific LNA 490 and/or PA 498. In an aspect, RF front end 488 can use one or more switches 492 to select a transmit or receive path using a specified filter 596, LNA 490, and/or PA 498, based on a configuration as specified by transceiver 424 and/or processor 426.

As such, the transceiver 424 may be configured to transmit and receive wireless signals through one or more antennas. In an aspect, the transceiver 424 may be tuned via a tuning component 422 of the modem 402 to operate at specified frequencies such that UE 104 can communicate with or locate, for example, one or more base stations 102 or one or more cells associated with one or more base stations 102. In an aspect, for example, the modem 402, via tuning component 422, can configure the transceiver 424 to operate at a specified frequency and power level based on the UE configuration of the UE 104 and the communication protocol used by the modem 402.

In an aspect, the modem 402 can be a multiband-multimode modem, which can process digital data and communicate with the transceiver 424 such that the digital data is sent and received using the transceiver 424. In an aspect, the modem 402 can be multiband and be configured to support multiple frequency bands for a specific communications protocol. In an aspect, the modem 402 can be multimode and be configured to support multiple operating networks and communications protocols. In an aspect, the modem 402 can control one or more components of UE 110 (e.g., transceiver 424) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the service scan configuration component 180 may be configured to expedite service acquisition after entering an out-of-service state and perform targeted RAT and/or frequency band searching/scanning to mitigate excess power consumption (e.g., resulting, from full RAT/frequency band scans). For example, the service scan configuration component 180 may be configured to receive one or more service parameters 426 and while in an out-of-service state, identify a geographic location of the UE 104 to perform a targeted search of RATs 418 and/or frequency bands 420 specific to or otherwise supported within the geographic location. The one or more service parameters 426 may include at least one of a global positioning system (GPS) location (e.g., by a global navigation stellate system (GNSS) or a last serving cell cell global identity (CUD), a motion sensor, an elapsed time in low power mode (LPM), a last known mobile country code (MCC), a last camped time, a geofence configuration (e.g., as described further herein with respect to FIG. 5), opportunistic Wi-Fi or GPS information, and/or crowd-sourced server. In some aspects, the out-of-service state may correspond to or otherwise trigger a low power mode at the UE 104.

For instance, during the out-of-service state (e.g., corresponding to a radio resource disconnection), the service scan configuration component 180 may be configured to perform a targeted service scan based on location information of the UE 104, with the location information corresponding to at least one of the CGI or GPS location information. The service scan configuration component 180 may include geofence component 404, which may be configured to obtain a geofence identifier corresponding to a polygon forming a geographic region including one or more boundaries. The geofence component 404 may include a number of internal 406 and border geofences 408. For example, an internal geofence 406 may include or otherwise identify an internal region of a single MCC. In some aspects, the single MCC may include one or more RATs and one or more associated frequency bands. A border geofence 408, on the other hand, may identify a border region of at least two MCCs. In some aspects, each of the at least two MCCs may include one or more RATs and one or more associated frequency bands.

The service scan configuration component 180 may further include a location determination component 410 configured to determine whether a last serving cell CGI is known. That is, after a first time duration (e.g., as further described herein with respect to FIG. 7) in the out-of-service state has been met or elapsed, rather than continuing to perform full RAT/frequency band scans based on frequency data in an acquisition database, the service scan configuration component 180 may determine a location of the UE 104. Specifically, prior to or in conjunction with obtaining GPS location information, the location determination component 410 may determine whether a last serving cell CGI is known to identify a location of the UE 104. If the CQI determination component 410 determines that a last serving cell CGI is unknown, service scan configuration component 180 may utilize GPS location information in identifying a location of UE 104. Otherwise, one or both of the CGI and GPS location information may be utilized for location identification purposes when the CGI is known.

In some aspects, geofence component 404 may determine that a geofence for a particular geographic area as identified by the location information does not exist or is not found. Upon such determination, the location determination component 410 may be configured to initiate periodic GPS location acquisitions according to a GPS acquisition timer to determine the position of UE 104 while continuing, in parallel, with cellular scans.

The service scan configuration component 180 may further include a UE movement determination component 412, which may be configured to whether the UE 104 is stationary. That is, the service scan configuration component 180 may take into account a movement state of the UE 104 during an out-of-service state to identify a location of the UE 104, and in turn, an MCC. For instance, the modem 402 may obtain GPS location information based on determining that the UE 104 is not stationary and after the first time duration has elapsed. If the UE 104 is determined to be stationary by the UE movement determination component 412, the service scan configuration component 180 may be configured to obtain the GPS location information after a time duration that is longer than the first time duration has elapsed.

In some aspects, the UE movement determination component 410 may determine whether the UE 104 is stationary based at least on a last known GPS coordinates at the time of entering the out-of-service state and/or an elapsed time in the out-of-service state. For example, if the last known GPS coordinates at the time of entering the out-of-service state is known and the UE 104 has remained in the out-of-service state for a time satisfying a third time duration corresponding to a period of time between GPS location determinations, the UE movement determination component 410 may determine that the UE 104 (e.g., via a motion sensor) is stationary, thereby retriggering the location determination component 410 to obtain GPS location information (e.g., GPS coordinates) and for the MCC determination component 414 to determine the MCC 416 based on the GPS location information.

Further, for example, if the last known GPS coordinates at the time of entering the out-of-service state is unknown and the UE 104 has remained in the out-of-service state for a time satisfying twice the first time duration, the UE movement determination component 410 may determine that the UE 104 (e.g., via a motion sensor) is stationary, thereby triggering the location determination component 410 to obtain GPS location information (e.g., GPS coordinates). The MCC determination component 414 may then obtain a corresponding geofence from the geofence component 404 based on the location information so as to allow the MCC determination component 4124 to determine the MCC 416 from the geofence identifier. The location determination component 410 may also determine a shortest distance to a neighboring MCC's geofences based at least on the location information.

Additionally, in some aspects, if the last known GPS coordinates at the time of entering the out-of-service state is unknown and the UE 104 has remained in the out-of-service state for a time satisfying the first time duration, the UE movement determination component 410 may determine that the UE 104 (e.g., via a motion sensor) is non-stationary, thereby triggering the location determination component 410 to obtain GPS location information (e.g., GPS coordinates). The MCC determination component 414 may then obtain a corresponding geofence from the geofence component 404 based on the location information so as to allow the MCC determination component 4124 to determine the MCC 416 from the geofence identifier. The location determination component 410 may also determine a shortest distance to a neighboring MCC's geofences based at least on the location information.

Based on the location information obtained by the location determination component 410, an MCC determination component 414 may determine an MCC for the particular geographic region where the UE 104 is determined to be located. For example, based on one or both of the last serving cell CGI or the GPS location information, and considering the movement of the UE 104 via the UE movement determination component 412, the MCC determination component 414 may determine one or more RATs 418 and/or frequency bands 420 for out-of-service scanning within the particular geographic area.

FIG. 5 is a diagram illustrating various geofences used in determining an associated MCC for service scanning. Specifically, a geofence may be a polygon and/or shape forming a geographic region including one or more boundaries. That is, a geofence may represent or otherwise indicate a geographic region of a particular country or state having at least one mobile operator providing network service on at least one RAT and/or associated frequency bands. Each polygon and/or shape forming a specific geographic region may correspond to a series of coordinates (e.g., longitude and latitude) defining the one or more boundaries. For example, internal geofences 502, 504, and 506 may be formed of distinct polygons outlining the geographical area where service may be provided for RATs and/or frequency bands associated with that area. The internal geofences 502, 504, and 506 are each associated with a geographic area having a single MCC. However, the border geofences 508 and 510 may identify a border region of at least two MCCs. In some aspects, each of the at least two MCCs may include one or more RATs and one or more associated frequency bands. For instance, border geofence 508 may include or otherwise overlap internal geofences 504 and 506, while border geofence 510 may include or overlap internal geofences 502 and 504. As such, border geofence 508 may be associated with the MCCs for one or both of the internal geofences 504 and 506, and border geofence 510 may be associated with the MCCs for one or both of the internal geofences 502 and 504.

In some aspects, one or more of the internal geofences 502, 504, and 506 may trigger RAT and/or frequency band scans configured for the MCC of the particular internal geofence. In some aspects, one or more of the border geofences 508 or 510 may be used by the service scan configuration component 180 to scan RATs and/or frequency bands in one or both the overlapping internal geofences or portions thereof. For example, the MCC determination component 414 may be configured to determine or check for cells or network entities for bordering MCCs in a frequently dwelt database. In some aspects, the frequently dwelt database may include one or more cells on which the UE 104 has selected to a number of times satisfying (e.g., meets or exceeds) a frequent selection threshold. The service scan configuration component 180 may initiate a RAT and/or frequency band scan for at least one MCC associated with at least one of the overlapping internal geofences when at least one bordering cell, that is a cell within the border geofence, is not present in the frequently dwelt database. The service scan configuration component 180 may scan one or more RATS and/or associated frequency bands configured for both of the overlapping internal geofences (e.g., within the polygon and/or shape forming the geographic area of the border geofence) when at least one bordering cell is present in the frequently dwelt database.

Figure 6:
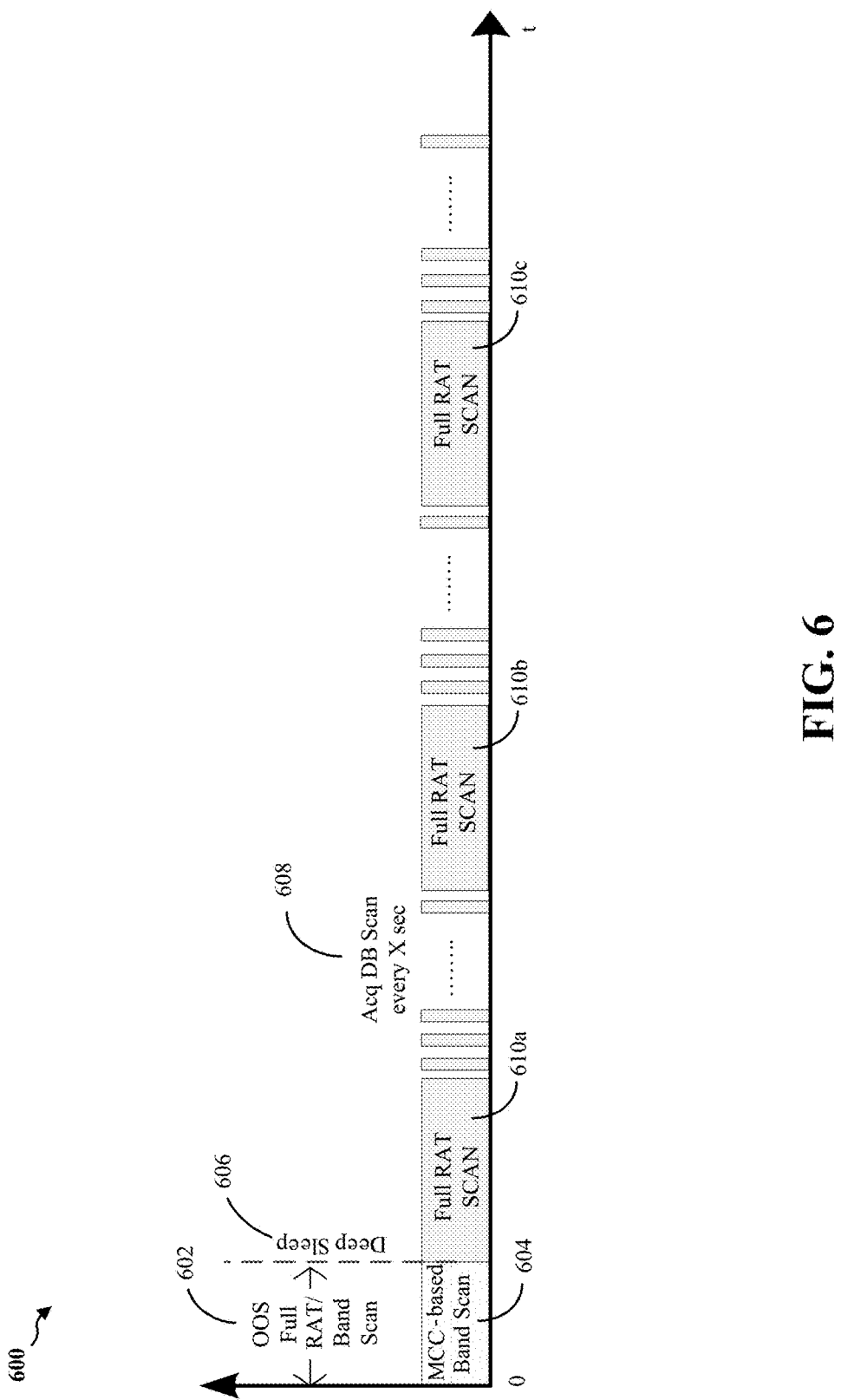
FIG. 6 is a chart diagram illustrating an aspect of a service search scheme in accordance with various aspects of the present disclosure.

FIG. 6 is a diagram illustrating an out-of-service scanning timeline 600 at a UE such as UE 104 including service scan configuration component 180. For example, UE 104 may enter an out-of-service state representing a loss or disconnection of an RRC connected state. Upon entering the out-of-service state, the UE 104 may perform at least one of a full RAT and/or frequency band scan 602 or an MCC-based band scan 604. The UE 104 may enter deep sleep 606 (e.g., low power mode) after a period of time in the out-of-service state. In the deep sleep 606 or low power mode, the UE 104 may perform full RAT and/or frequency band scans 610a, 610b, and 610c periodically until a suitable cell or network entity is found. Additionally, the UE 104 may perform an acquisition database scan 608 every X sec to search for cells the UE 104 previously selected to or camped on. During deep sleep 60, the UE 104 may periodically wake up for a defined period of time before reentering deep sleep 60. For example, while maintaining the out-of-service state, the UE 104 may wake up from deep sleep 606 a first number of times every first duration (e.g., 10 iterations of 30 sec), a second number of times every second duration (e.g., 10 iterations of 45 sec), and every subsequent wake up every third duration (e.g., 60 sec).

Figure 7:
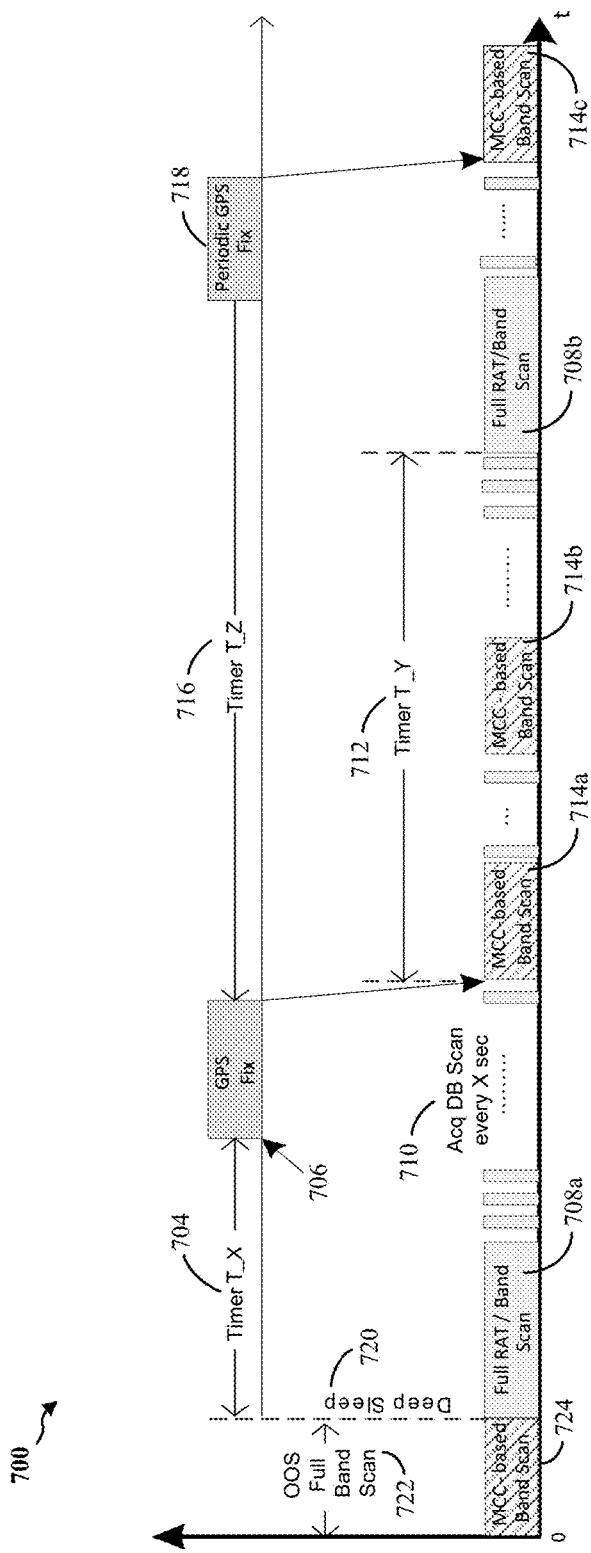
FIG. 7 is a chart diagram illustrating another aspect of a service search scheme in accordance with various aspects of the present disclosure.

FIG. 7 is a diagram illustrating an out-of-service scanning timeline 700 at a UE such as UE 104 including service scan configuration component 180. For example, UE 104 may enter an out-of-service state representing a loss or disconnection of an RRC connected state. Upon entering the out-of-service state, the UE 104 may perform at least one of a full RAT and/or frequency band scan 722 or an MCC-based band scan 724. The UE 104 may enter deep sleep 720 (e.g., low power mode) after a period of time in the out-of-service state. In the deep sleep 720 or low power mode, the UE 104 may perform one or more full RAT and/or frequency band scans 708a, and may scan an acquisition database 710 every X seconds for previously camped cells.

However, instead of continuing to perform such full scans, the UE 104 may initiate a GPS fix 706 after a timer T_x 704 having the first time duration expires or elapses. In some aspects, the modem 402 (e.g., multi-mode modem) may trigger acquisition of the GPS location information when the GPS fix is available. Accordingly, the first time duration may correspond to a duration that may elapse after entry into the out-of-service state before obtaining the location information (e.g., GPS fix). Further, the GNSS may provide at least one breach event for the geofences such that the modem 402 determines one or more MCCs associated with the breached geofences. That is, modem 402 may detect that the UE 104 has breached or entered a border or internal geofence based at least on the location information.

The MCC information may be utilized by the UE 104 to perform one or more periodic MCC-based band scans 714a and/or 714b associated with the particular geographic region of the geofence. The MCC-based band scans 714a and/or 714b may be performed during a period of time corresponding to a timer T_y 712. Timer T_y 712 may correspond to a period of time during which the UE 104 may scan one or more RATs and/or frequency bands associated with at least one MCC obtained by the location information prior to switching back to a full RAT and/or frequency band scan 708b. In some aspects, the modem 402, and more specifically, the service scan configuration component 180 may determine the value of timer T_y 712 based on the representation of $T\_y=(D/velocity)*constant$ (in sec), where D is the shortest distance to a nearest neighboring MCC's geofence. In some aspects, during the interval representing timer T_y 712, the UE 104 can occasionally intersperse, equally or unequally, a full RAT and frequency band scan over the duration of timer T_y 712.

The UE 104 may initiate a timer T_z 716 after triggering the GPS fix 706. Timer T_z 716 may correspond to a period of time that may elapse before retriggering the GPS fix 718. That is, timer T_z may be a time duration between GPS location acquisitions. Accordingly, upon a determination that the timer T_z has expired or elapsed, the UE 104 may retriggering the GPS fix 718 and obtain MCC information to perform at least one MCC-based band scan 714c.

In some aspects, a fourth timer may trigger a GPS fix when a corresponding time duration in low power mode has expired or elapsed. That is, in instances where the UE 104 is in the low power mode, the fourth timer may be activated and upon a determination that the corresponding time duration of the fourth timer has elapsed, a GPS fix for obtaining location information of the UE 104 may be triggered. Further, when the elapsed time in the low power mode satisfies the fourth timer (e.g., meets or exceeds), the UE 104 may trigger a GPS fix in parallel with one or more wireless wide area network (WWAN) RATs and/or frequency bands. However, when the elapsed time in the low power mode does not satisfy the fourth timer (e.g., does not meet or exceed), the UE 104 may assume or use a last known MCC prior to entering the low power mode. In some aspects, the modem 402 may obtain the elapsed time during or when entering the low power mode and when exiting from the low power mode.

In some aspects, a fifth timer may trigger a periodic GPS fix if the UE 104 remains in the out-of-service state. For example, when the UE 104 is in the out-of-service state, the fifth timer may be activated to trigger GPS fixes on a periodic basis corresponding to a duration of the fifth timer. The fifth timer may be greater than the fourth timer.

In some aspects, cell history of the UE 104 may be used to bias or configure any of the timers disclosed herein, such as the timer T_x 704 (e.g., having first time duration), the timer T_y 712 (e.g., having third time duration), and/or the timer T_z (e.g., having second time duration). Further, in some aspects, the cell history of the UE 104 may include a mapping of each GPS fix to one or more of a location area identity (LAI), a routing area identity (RAI), a tracking area identity (TAI), or at least one CGI.

In some aspects, the UE 104 may be configured to utilize at least one basic service set identification (BSSID) associated with a wireless location area network (WLAN) and the GPS location information (e.g., obtained directly or indirectly based on at least one of an LAI, TAI, RAI, BSSID, and/or GPS). Further, in some aspects, the UE 104 may be configured to utilize the GPS fix when or based on a determination that WLAN (e.g., Wi-Fi) is available and/or that WWAN is in an out-of-service state.

Further, in scenario where the UE 104 has camped in a border region of multiple MCCs such that the service scan configuration component 180 determines that the UE 104 is in a border geofence 408, the values of the timers such as timer T_x 704 and/or timer T_y 712 may be adjusted or configured accordingly. Specifically, if the UE 104 has camped in an adjacent MCC's public local mobile network (PLMN) at least once during a previous defined duration, then the service scan configuration component 180 may set or adjust the timer T_x 704 and/or timer T_y 712 to a value less than the preset time value. In some aspects, an adjacent MCC may be a neighboring MCC (e.g., associated with the Border geofence 408), and not the last MCC when the UE 104 went into the out-of-service state.

Figure 8:
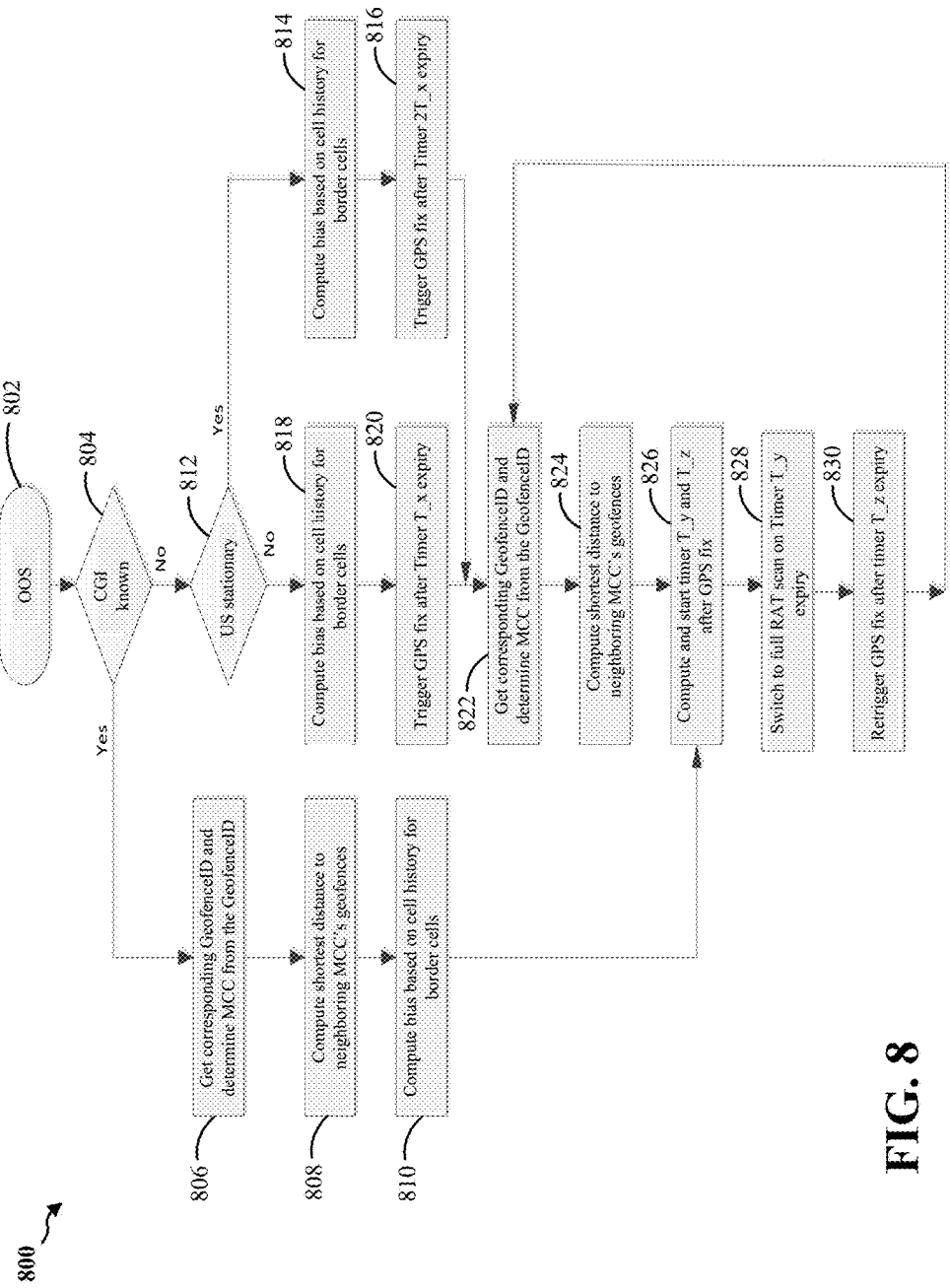
FIG. 8 is a flow diagram of an aspect of an out-of-service scanning procedure in accordance with various aspects of the present disclosure.

FIG. 8 is a flow diagram of an aspect of an out-of-service scanning procedure 800. The out-of-service scanning procedure 800 may be performed or executed by the modem 402 including the service scan configuration component 180 and/or one or more components or subcomponents thereof. At block 802, the UE 104, or more specifically, the modem 402 may enter or otherwise detect an out-of-service state. At block 804, the service scan configuration component 180 of the modem 402 may determine whether a last serving cell CGI, TAI, LAI, and/or RAI is known.

In some aspects, the GPS fix may be triggered when the UE 104 does not have the location information cached in the cell history database (e.g., as part of TAI/LAI/RAI or CGI level) mapping. In some aspects, at block 804, the UE 104 may alternatively determine whether a last serving cell CGI, TAI, LAI, and/or RAI has a GPS Fix cached. The UE 104 may opportunistically maintain the mapping of a GPS location (e.g., whenever available with the WWAN CGI or TAI/LAI/RAI and utilize the mapping with an approximate location for subsequent determinations).

If the last serving cell CGI, TAI, LAI, and/or RAI is known and/or has a GPS fix cached, at block 806, the service scan configuration component 180 may obtain a corresponding geofence identifier and determine an MCC from the geofence identifier. At block 808, the service scan configuration component 180 may compute a shortest distance to a neighboring MCC's geofences. At block 810, the service scan configuration component 180 may compute a bias based on a cell history for border cells, the bias corresponding to a time value applied to any one of the time durations. The out-of-service scanning procedure 800 may then proceed to block 826.

In some aspects, the timers may be tuned, configured, and/or biased based at least on cell history. For instance, if the UE fails to enter a neighboring country despite being in a border cell, at least some of these timers may be less aggressive compared to when the UE has visited the neighboring country.

If the last serving cell CGI, TAI, LAI, and/or RAI is known and/or has a GPS fix cached, at block 812, the service scan configuration component 180 may determine whether the UE is stationary. The out-of-service scanning procedure may proceed to block 814 if the UE is determined to be stationary, where the service scan configuration component 180 may compute the bias based on a cell history for border cells. At block 816, the service scan configuration component 180 may trigger a GPS fix after timer 2T_x expires or elapses (e.g., timer 2T_x corresponding to a duration twice as long as the first time duration, yet may be any value greater than T_x). The out-of-service scanning procedure 800 may then proceed to block 816.

The out-of-service scanning procedure may proceed to block 818 if the UE is determined not to be stationary, where the service scan configuration component 180 may compute the bias based on a cell history for border cells. At block 820, the service scan configuration component 180 may trigger a GPS fix after expiration of timer T_x 704. At block 822, the service scan configuration component 180 may obtain a corresponding geofence identifier and determine at least one MCC from the geofence identifier. At block 824, the service scan configuration component 180 may compute a shortest distance to at least one neighboring MCC's geofences. At block 826, the service scan configuration component 180 may compute and start timer T_y (e.g., third time duration) and T_z (e.g., third time duration) after the GPS fix. At block 828, the service scan configuration component 180 may switch to a full RAT scan after or upon an expiration of timer T_y. At block 830, the service scan configuration component 180 may retrigger a GPS fix after or upon expiration of timer T_z and return to block 822.

Figure 9:
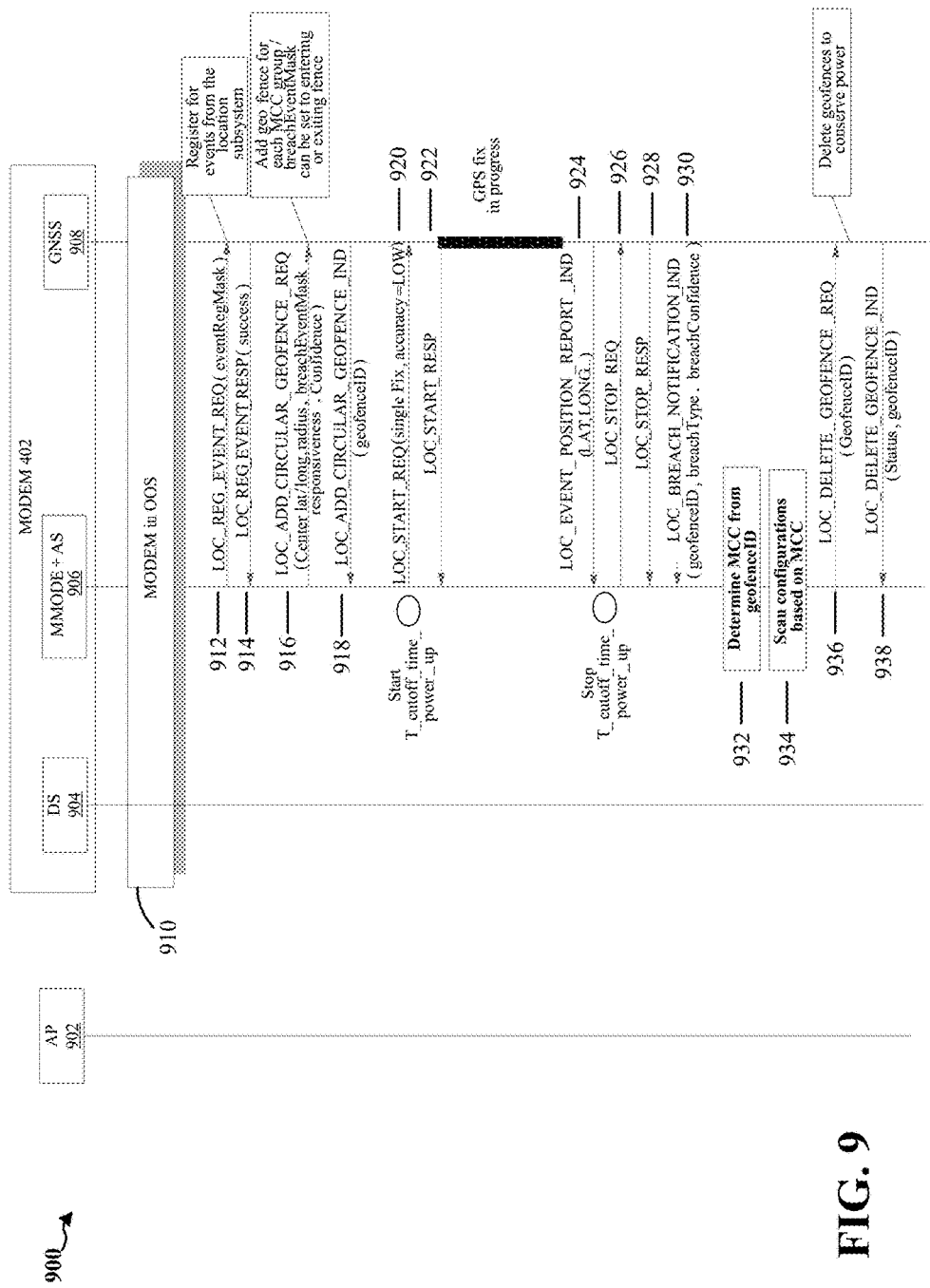
FIG. 9 is a flow diagram of an aspect of service acquisition during an out-of-service state in accordance with various aspects of the present disclosure.

FIG. 9 is a flow diagram 900 for configuring at least one geofence and triggering a GPS fix. The flow diagram 900 may include an access point (AP) 902, the modem 402, which may include a data service 904, a multi-mode (MMODE) and access stratum 906, and a GNSS 908. At 910, the modem may enter an out-of-service state. At 912, the MMODE and AS may send a location registration event request to the GNSS 908 to register for events from the location subsystem. At 914, the GNSS 908 may send a location registration event response indicating successful location acquisition. At 916, the MMODE and AS may send, to the GNSS 908, a geofence addition request including at least one of a center latitude, longitude, radius, breach event, and/or a confidence level value. As such, at 916, the MMODE and AS 906 may request to add a geofence for each MCC group. Further, the breach event may be set to an entering and/or exiting of the geofence.

At 918, the GNSS 908 may send, to the MMODE and AS 906, a location addition configuration indication including the geofence identifier of the added geofence. At 920, the MMODE and AS 906 may send a location start request including a single fix and accuracy level to the GNS 908. At 922, the GNSS 908 may send the location start response to the MMODE and AS 906. The GPS fix may be in progress at the GNSS 908 between 922 and 924. At 924, the GNSS 908 may send, to the MMODE and AS 906, a location event position response indication including at least the latitude and longitude information from the GPS fix. At 926, the MMODE and AS 906 may send, to the GNSS 908, a location stop request to trigger a termination of the GPS fix. At 928, the GNSS 908 may send, to the MMODE and AS 906, a location stop response.

At 930, the GNSS 908 may send, to the MMODE and AS 906, a location breach notification indication including at least one of a geofence identifier, breach type, and/or a breach confidence level. In some aspects, the breach type may be an entering or exiting of a geofence. The breach confidence level may be a value indicating a probability of the beaching event. At 932, the MMODE and AS 906 may determine an MCC from the geofence identifier. At 934, the MMODE and AS 906 may scan configurations of one or more RATS and/or frequency bands based on the MCC. At 936, the MMODE and AS 906 may send, to the GNSS 908, a location delete geofence request to delete a geofence identifier. The GNSS 908 may delete the geofences associated with the geofence identifier to conserve power. At 938, the GNSS 908 may send, to the MMODE and AS 906, a location delete geofence indication including a status of the geofence identifier.

Figure 10:
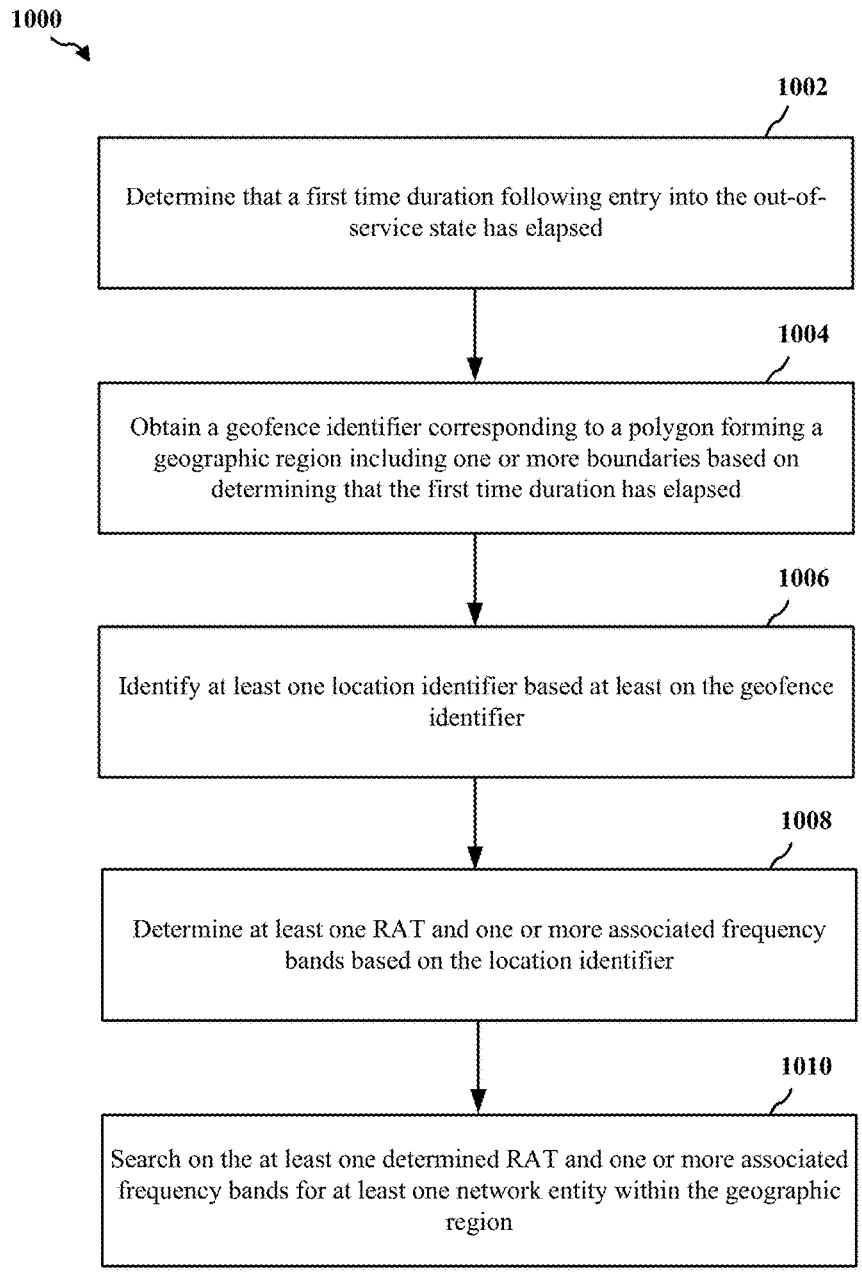
FIG. 10 is a flow diagram of an aspect of communication at a UE, which may be executed by the service scan configuration component of FIG. 4, in accordance with various aspects of the present disclosure.

Referring to FIG. 10, a UE such as UE 104 (FIGS. 1 and 4) may include one or more processors to perform an aspect of a method 100 for performing a targeted out-of-service scan. While, for purposes of simplicity of explanation, the method is shown and described as a series of acts, it is to be understood and appreciated that the method is not limited by the order of acts, as some acts may, in accordance with one or more embodiments, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 1002, the method 1000 may determine that a first time duration following entry into the out-of-service state has elapsed. For example, in an aspect, the modem 402 of the UE 104 may execute service scan configuration component 180 to determine that a first time duration (e.g., timer T_x 704) following entry into the out-of-service state has elapsed.

At block 1004, the method 1000 may obtain a geofence identifier corresponding to a shape forming a geographic region including one or more boundaries based on determining that the first time duration has elapsed. For example, in an aspect, the modem 402 of the UE 104 may execute service scan configuration component 180 to obtain a geofence identifier corresponding to a shape forming a geographic region (e.g., internal geofence 406 and/or border geofence 408) including one or more boundaries based on determining that the first time duration (e.g., timer T_x 704) has elapsed. In some aspects, the shape may correspond to a polygon.

At block 1006, the method 1000 may identify at least one location identifier based at least on the geofence identifier. For example, in an aspect, the modem 402 of the UE 104 may execute service scan configuration component 180 to identify at least one MCC 416 based at least on the geofence identifier.

At block 1008, the method 1000 may determine at least one RAT and one or more associated frequency bands based on the location identifier. For example, in an aspect, the modem 402 of the UE 104 may execute service scan configuration component 180 to determine one or more RATs 418 and one or more associated frequency bands 420 based on the MCC 416.

At block 1010, the method 1000 may search on the at least one determined RAT and one or more associated frequency bands for at least one network entity within the geographic region. For example, in an aspect, the modem 402 of the UE 104 may execute service scan configuration component 180 to search on the one or more RATs 418 and one or more associated frequency bands 420 for at least one network entity (e.g., base station 102) within the geographic region.

In some aspects, although not shown, the method 1000 may further determine whether a last serving CGI, TAI, LAI, and/or RAI is known. The geofence identifier may be obtained based on determining that the last serving cell CGI, TAI, LAI, and/or RAI is known.

In some aspects, although not shown, the method 1000 may further determine whether the UE 104 is stationary based on determining that the last serving cell CGI, TAI, LAI, and/or RAI is unknown, and obtaining GPS location information based on determining that the first time duration (e.g., timer $T\_x$ 704) has elapsed and that the UE 104 is not stationary. The geofence identifier may be obtained based on the GPS location information.

In some aspects, although not shown, the method 1000 may further obtain GPS location information based on determining that a second time duration (e.g., timer $T\_z$ 716) greater than the first time (e.g., timer $T\_x$ 704) duration has elapsed and that the UE 104 is stationary. The first time duration and the second time duration may be configurable based on a network entity or cell selection history.

In some aspects, the geofence identifier may correspond to a border geofence 408 identifying a border region of at least two location identifiers, each of the at least two location identifiers including one or more RATs 418 and one or more associated frequency bands 420. Although not shown, to search on the at least one determined RAT 418 and one or more associated frequency bands 420 for at least one network entity within the geographic region, the method 1000 may further determine whether the at least one network entity (e.g., base station 102) is located in a frequently dwelt database including one or more network entities which the UE 104 has previously selected to a number of time satisfying a frequent threshold, the at least one network entity associated with at least one of the at least two location identifiers (e.g., of the border geofence 408). The method 1000 may further search on the one or more RATs 418 and the one or more associated frequency bands 420 of one of the at least two location identifiers based on determining that at least one network entity is not located in the frequently dwelt database, and search on the one or more RATs 418 and the one or more associated frequency bands 420 of both of the at least two location identifiers based on determining that at least one network entity is located in the frequently dwelt database.

In some aspects, the geofence identifier may correspond to an internal geofence 406 identifying an internal region of a single location identifier, the single location identifier including one or more RATs 418 and one or more associated frequency bands 420. Although not shown, to search on the at least one determined RAT 418 and one or more associated frequency bands 420 for at least one network entity within the geographic region, the method 1000 may further search on the one or more RATs 418 and one or more associated frequency bands 420 of the single location identifier for the at least one network entity.

In some aspects, although not shown, the method 1000 may further determine a shortest distance from the one or more boundaries of the geographic region (e.g., associated with one of the internal geofence 406 or border geofence 408) to one or more neighboring boundaries associated with at least one neighboring location identifier, and obtain a second time duration (e.g., timer $T\_z$ 716) corresponding to a period of time for performing the search for at least one network entity based on the determined shortest distance.

In some aspects, although not shown, the method 1000 may further determine that the second time duration (e.g., timer $T\_z$ 716) has elapsed after initiating the search for the at least one network entity, the second time duration occurring after the first time duration, and perform a full RAT search based on determining that the second time duration has elapsed.

In some aspects, although not shown, the method 1000 may further obtain a third time duration (e.g., timer $T\_y$ 712) corresponding to a period of time between GPS location determinations, determine that the third time duration has elapsed, determine second GPS location information based on determining that the third time duration has elapsed, and obtain another geofence identifier corresponding to a geographic region including one or more boundaries.

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of communication at a user equipment (UE), comprising:
    while in an out-of-service state corresponding to a radio resource disconnection:
        determining that a first time duration following entry into the out-of-service state has elapsed;
        determining whether a last serving cell cell global identity (CGI) is known;
        obtaining a geofence identifier representing a shape forming a geographic region including one or more boundaries based on determining that the first time duration has elapsed and that the last serving cell CGI is known;
        identifying at least one location identifier based at least on the geofence identifier;
        determining at least one radio access technology (RAT) and one or more associated frequency bands based on the at least one location identifier; and
        searching on the at least one RAT and one or more associated frequency bands for at least one network entity within the geographic region.

2. The method of claim 1, further comprising:
    determining whether the UE is stationary based on determining that the last serving cell CGI is unknown; and
    obtaining global positioning system (GPS) location information based on determining that the first time duration has elapsed and that the UE is not stationary,
    wherein the geofence identifier is obtained based on the GPS location information.

3. The method of claim 2, further comprising obtaining GPS location information based on determining that a second time duration greater than the first time duration has elapsed and that the UE is stationary.

4. The method of claim 3, wherein the first time duration and the second time duration are configurable based on a network entity selection history.

5. The method of claim 1, wherein the geofence identifier corresponds to a border geofence identifying a border region of at least two location identifiers, each of the at least two location identifiers includes one or more RATS and one or more associated frequency bands.

6. The method of claim 5, wherein searching on the at least one RAT and one or more associated frequency bands for at least one network entity within the geographic region includes:
    determining whether the at least one network entity is located in a frequently dwelt database including one or more network entities which the UE has previously selected to a number of times satisfying a frequent threshold, the at least one network entity associated with at least one of the at least two location identifiers;
    searching on the one or more RATs and the one or more associated frequency bands of one of the at least two location identifiers based on determining that at least one network entity is not located in the frequently dwelt database; and
    searching on the one or more RATs and the one or more associated frequency bands of both of the at least two location identifiers based on determining that at least one network entity is located in the frequently dwelt database.

7. The method of claim 1, wherein the geofence identifier corresponds to an internal geofence identifying an internal region of a single location identifier, the single location identifier includes one or more RATs and one or more associated frequency bands.

8. The method of claim 7, wherein searching on the at least one RAT and one or more associated frequency bands for the at least one network entity within the geographic region includes:
    searching on the one or more RATs and one or more associated frequency bands of the single location identifier for the at least one network entity.

9. The method of claim 1, further comprising:
    determining a shortest distance from the one or more boundaries of the geographic region to one or more neighboring boundaries associated with at least one neighboring location identifier; and
    obtaining a second time duration corresponding to a period of time for performing the search for at least one network entity based on the determined shortest distance.

10. The method of claim 9, further comprising:
    determining that the second time duration has elapsed after initiating the search for the at least one network entity, the second time duration occurring after the first time duration; and
    performing a full RAT search based on determining that the second time duration has elapsed.

11. The method of claim 9, further comprising:
    obtaining a third time duration corresponding to a period of time between GPS location determinations;
    determining that the third time duration has elapsed;
    determining second GPS location information based on determining that the third time duration has elapsed; and
    obtaining another geofence identifier.

12. An apparatus for communication, comprising:
    a memory; and
    at least one processor coupled to the memory and while in an out-of-service state corresponding to a radio resource disconnection, the at least one processor is configured to:
        determine that a first time duration following entry into the out-of-service state has elapsed;
        determine whether a last serving cell cell global identity (CGI) is known;
        obtain a geofence identifier representing a shape forming a geographic region including one or more boundaries based on determining that the first time duration has elapsed and that the last serving cell CGI is known;
        identify at least one location identifier based at least on the geofence identifier;
        determine at least one radio access technology (RAT) and one or more associated frequency bands based on the at least one location identifier; and
        search on the at least one RAT and one or more associated frequency bands for at least one network entity within the geographic region.

13. The apparatus of claim 12, wherein the at least one processor is further configured to:
    determine whether the UE is stationary based on determining that the last serving cell CGI is unknown; and obtain global positioning system (GPS) location information based on determining that the first time duration has elapsed and that the UE is not stationary,
wherein the geofence identifier is obtained based on the GPS location information.

14. The apparatus of claim 13, wherein the at least one processor is further configured to obtain GPS location information based on determining that a second time duration greater than the first time duration has elapsed and that, the UE is stationary.

15. The apparatus of claim 14, wherein the first time duration and the second time duration are configurable based on a network entity selection history.

16. The apparatus of claim 12, wherein the geofence identifier corresponds to a border geofence identifying a border region of at least two location identifiers, each of the at least two location identifiers includes one or more RATs and one or more associated frequency bands.

17. The apparatus of claim 16, wherein to search on the at least one RAT and one or more associated frequency bands for at least one network entity within the geographic region, the at least one processor is further configured to:
   determine whether the at least one network entity is located in a frequently dwelt database including one or more network entities which the UE has previously selected to a number of time satisfying a frequent threshold, the at least one network entity associated with at least one of the at least two location identifiers;
   search on the one or more RATs and the one or more associated frequency bands of one of the at least two location identifiers based on determining that at least one network entity is not located in the frequently dwelt database; and
   search on the one or more RATs and the one or more associated frequency bands of both of the at least two location identifiers based on determining that at least one network entity is located in the frequently dwelt database.

18. The apparatus of claim 12, wherein the geofence identifier corresponds to an internal geofence identifying an internal region of a single, location identifier, the single location identifier includes one or more RATs and one or more associated frequency bands.

19. The apparatus, of claim 18, wherein to search on the at least one RAT and one or more associated frequency bands for the at least one network entity within the geographic region, the at least one processor is further configured to:
   search on the one or more RATs and one or more associated frequency bands of the single location identifier for the at least one network entity.

20. The apparatus of claim 12, wherein the at least one processor is further configured to:
   determine a shortest distance from the one or more boundaries of the geographic region to one or more neighboring boundaries associated with at least one neighboring location identifier; and
   obtain a second time duration corresponding to a period of time for performing the search for at least one network entity based on the determined shortest distance.

21. The apparatus of claim 20, wherein the at least one processor is further configured to:
   determine that the second time duration has elapsed after initiating the search for the at least one network entity, the second time duration occurring after the first time duration; and perform a full RAT search based on determining that the second time duration has elapsed.

22. The apparatus of claim 20, wherein the at least one processor is further configured to:
   obtain a third time duration corresponding to a period of time between GPS location determinations;
   determine that the third time duration has elapsed;
   determine second GPS location information based on determining that the third time duration has elapsed; and
   obtain another geofence identifier.

23. An apparatus for communication, comprising:
   while in an out-of-service state corresponding to a radio resource disconnection:
      means for determining that a first time duration following entry into the out-of-service state has elapsed;
      means for determining whether a last serving cell cell global identity (CGI) is known;
      means for obtaining a geofence identifier representing a shape forming a geographic region including one or more boundaries based on determining that the first time duration has elapsed and that the last serving cell CGI is known;
      means for identifying at least one location identifier based at least on the geofence identifier;
      means for determining at least one radio access technology (RAT) and one or more associated frequency bands based on the at least one location identifier; and
      means for searching on the at least one RAT and one or more associated frequency bands for at least one network entity within the geographic region.

24. The apparatus of claim 23, further comprising:
   means for determining whether the UE is stationary based on determining that the last serving cell CGI is unknown; and
   means for obtaining global positioning system (GPS) location information based on determining that the first time duration has elapsed and that the UE is not stationary, wherein the geofence identifier is obtained based on the UPS location information.

25. The apparatus of claim 24, further comprising means for obtaining GPS location information based on determining, that a second time duration greater than the first time duration has elapsed and that the UE is stationary.

26. The apparatus of claim 25, wherein the first time duration and the second time duration are configurable based on a network entity selection history.

27. A non-transitory computer-readable medium storing computer executable code for communication, comprising code for:
   while in an out-of-service state corresponding to a radio resource disconnection;
      determining that a first time duration following entry into the out-of-service state has elapsed;
      determining whether a last serving cell cell global identity (CGI) is known;
      obtaining a geofence identifier representing a shape forming a geographic region including one or more boundaries based on determining that the first time duration has elapsed and that the last serving cell CGI is known;
      identifying at least one location identifier based at least on the geofence identifier;

determining at least one radio access technology (RAT) and one or more associated frequency bands based on the at least one location identifier; and searching on the at least one RAT and one or more associated frequency bands for at least one network entity within the geographic region.

\* \* \* \* \*